US010107079B1

United States Patent
Frey et al.

(10) Patent No.: US 10,107,079 B1
(45) Date of Patent: Oct. 23, 2018

(54) ELECTRIC SUBMERSIBLE MOTOR THRUST BEARING SYSTEM

(71) Applicant: Summit ESP, LLC, Tulsa, OK (US)

(72) Inventors: Jeffrey G. Frey, Broken Arrow, OK (US); Larry James Parmeter, Broken Arrow, OK (US)

(73) Assignee: SUMMIT ESP, LLC, Tulsa, OK (US)

( * ) Notice: Subject to any disclaimer, the term of this patent is extended or adjusted under 35 U.S.C. 154(b) by 0 days.

(21) Appl. No.: 15/793,828

(22) Filed: Oct. 25, 2017

(51) Int. Cl.
*F16C 27/08* (2006.01)
*F16C 17/04* (2006.01)
(Continued)

(52) U.S. Cl.
CPC .......... *E21B 43/128* (2013.01); *E21B 43/126* (2013.01); *E21B 43/38* (2013.01); *F04D 29/047* (2013.01); *F04D 29/0413* (2013.01); *H02K 5/132* (2013.01); *H02K 5/16* (2013.01); *F04D 7/045* (2013.01); *F04D 13/08* (2013.01); *F04D 29/106* (2013.01); *F16C 17/045* (2013.01); *F16C 27/08* (2013.01); *F16C 2380/26* (2013.01)

(58) Field of Classification Search
CPC .... F16C 17/045; F16C 17/26; F16C 2380/26; F61C 27/08; E21B 43/126; E21B 43/128; E21B 43/38; F04D 7/045; F04D 29/047; F04D 13/08; F04D 29/0413; F04D 29/106; H02K 5/132; H02K 5/16; H02K 7/08; F05B 2240/52
USPC ............... 384/121, 194, 248, 303, 308, 368; 310/87, 90; 417/414
See application file for complete search history.

(56) References Cited

U.S. PATENT DOCUMENTS

| 2,274,764 A | * | 3/1942 | Yeomans | ................ F16C 17/06 |
| | | | | 384/224 |
| 3,153,160 A | * | 10/1964 | Carle | .................... F04D 29/128 |
| | | | | 277/365 |

(Continued)

FOREIGN PATENT DOCUMENTS

| GB | 984116 A | * | 2/1965 | ........... H02K 5/1285 |
| JP | 02097247 A | * | 4/1990 | ............ H02K 5/167 |
| WO | 2017066032 A1 | | 4/2017 | |

OTHER PUBLICATIONS

PCT Application Serial No. PCT/US2017/058347, International Search Report, dated Jul. 19, 2018, 3 pages.

(Continued)

Primary Examiner — Marcus Charles
(74) Attorney, Agent, or Firm — Gilliam IP PLLC

(57) ABSTRACT

An electric submersible motor thrust bearing system is described. An electric submersible motor thrust bearing system includes a thrust bearing assembly carrying a thrust of an electric submersible motor, the thrust bearing assembly including a split ring secured around a shaft of the electric submersible motor inward of a rotatable thrust runner, the rotatable thrust runner coupled around an outer diameter of the split ring and mated above a non-rotatable thrust bearing, the rotatable thrust runner serving as a barrier to radial expansion of the split ring, a lock ring secured to the thrust runner by a threaded connection, at least a portion of the lock ring above the split ring and at least a portion of the thrust runner below the split ring, and the threaded connection securing the split ring axially between the lock ring and the thrust runner.

26 Claims, 14 Drawing Sheets

(51) Int. Cl.
*E21B 43/12* (2006.01)
*F04D 29/04* (2006.01)
*H02K 5/16* (2006.01)
*E21B 43/38* (2006.01)
*F04D 29/041* (2006.01)
*F04D 29/047* (2006.01)
*H02K 5/132* (2006.01)
*F04D 7/04* (2006.01)
*F04D 29/10* (2006.01)
*F04D 13/08* (2006.01)

(56) References Cited

U.S. PATENT DOCUMENTS

| | | | | |
|---|---|---|---|---|
| 3,326,612 | A * | 6/1967 | Schaefer | F16C 41/02 384/304 |
| 3,520,579 | A * | 7/1970 | Isomoto | F16C 17/04 384/307 |
| 4,033,647 | A * | 7/1977 | Beavers | F16C 17/04 384/223 |
| 4,042,847 | A * | 8/1977 | Jensen | F16J 15/164 310/87 |
| 4,199,201 | A * | 4/1980 | Trzeciak | E21B 4/003 175/371 |
| 4,672,249 | A * | 6/1987 | Iwata | F16C 17/06 310/87 |
| 5,408,155 | A * | 4/1995 | Dickinson | F16C 27/063 310/67 R |
| 5,765,950 | A * | 6/1998 | Eno | F04D 29/0413 384/368 |
| 6,565,257 | B1 * | 5/2003 | Kennedy | F04D 29/0413 384/122 |
| 2005/0199384 | A1 | 9/2005 | Mack et al. | |
| 2006/0177320 | A1 * | 8/2006 | Zhuang | F04D 13/10 417/414 |
| 2007/0152523 | A1 * | 7/2007 | Bookout | H02K 5/00 310/87 |
| 2012/0257998 | A1 | 10/2012 | Parmeter et al. | |
| 2017/0248150 | A1 | 8/2017 | Nelson et al. | |

OTHER PUBLICATIONS

PCT Application Serial No. PCT/US2017/058347, International Written Opinion, dated Jul. 19, 2018, 5 pages.

* cited by examiner

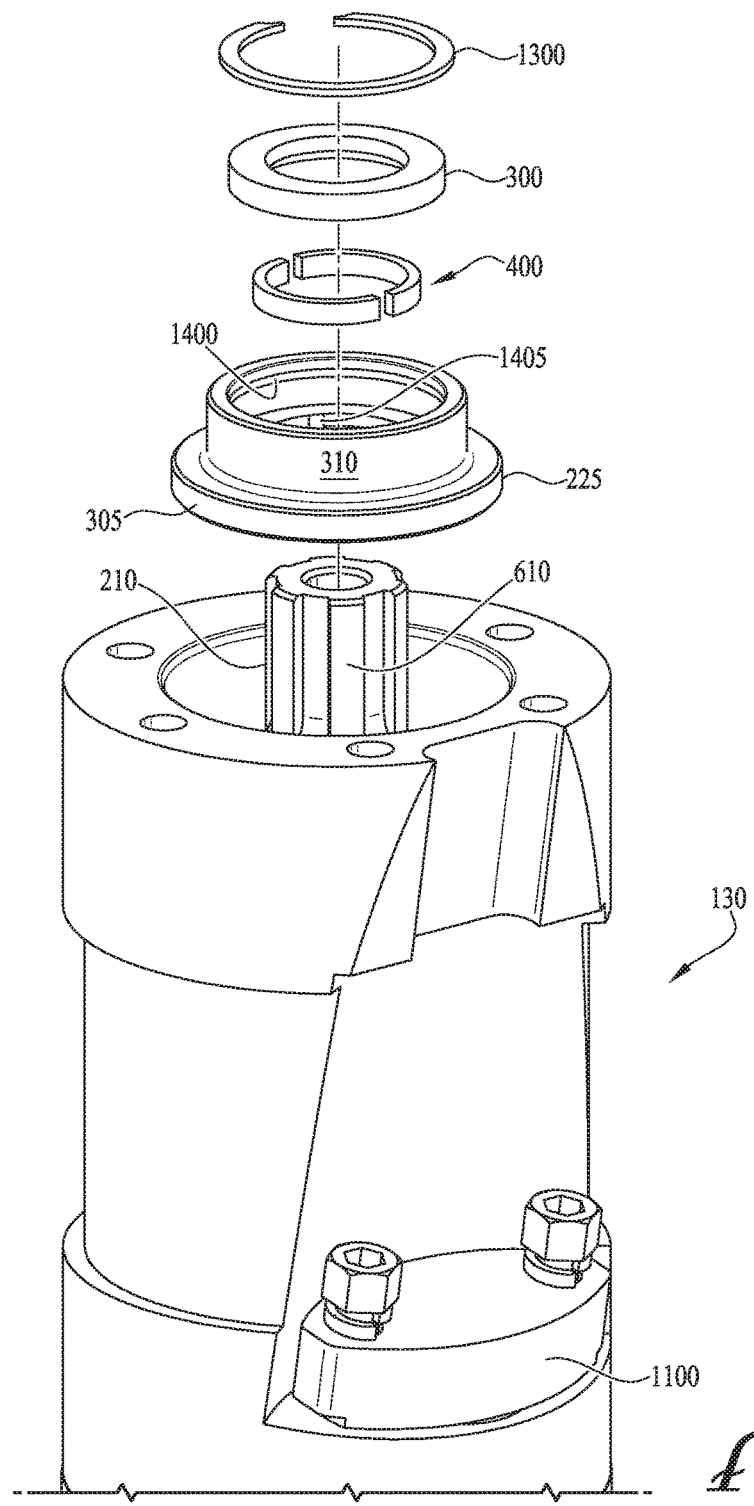

ELECTRIC SUBMERSIBLE MOTOR THRUST BEARING SYSTEM

BACKGROUND OF THE INVENTION

1. Field of the Invention

Embodiments of the invention described herein pertain to the field of electric submersible pumps. More particularly, but not by way of limitation, one or more embodiments of the invention enable an electric submersible motor thrust bearing system.

2. Description of the Related Art

Fluid, such as natural gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser. A rotating shaft runs through the central hub of the impeller, and the impeller is keyed to the shaft such that the impeller rotates with the shaft. An electric motor below the pump turns the shaft.

The electric motor is typically a two-pole, three-phase squirrel cage induction motor. The head of the motor includes a thrust bearing near the top of the motor. The thrust bearing holds the weight of the motor's rotor and shaft hanging below the motor head, which can be between 50-2,000 pounds, depending on the size and length of the motor.

Conventionally, motor thrust bearing sets are hydrodynamic and include a thrust runner that rotates with the shaft opposite a thrust bearing that does not rotate. Above the thrust runner is a lock ring that is bolted to the top of thrust runner and rotates with the thrust runner. A split ring is seated in a groove around the motor shaft inside the lock ring. The split ring, secured within the shaft groove, is meant to prevent the thrust bearing assembly from sliding axially along the motor shaft. The lock ring is typically bolted to the thrust runner, and in this manner, held in place around the split ring. When bolted in place, the lock ring prevents the split ring from expanding radially out of the shaft groove, keeping the split ring from popping out of the groove and holding the split ring axially in place on the motor shaft.

A problem that arises is that during operation of the electric submersible motor, the bolts that secure the lock ring to the thrust runner back out and sheer, loosening the lock ring's hold on the split ring. When the lock ring disengages, the split ring radially expands and then move axially along the motor shaft during operation of the ESP motor. Movement of the split ring can cause the motor shaft to drop through and fall out of the motor, causing complete motor failure.

As is apparent from the above, current thrust bearings for electric submersible motors suffer from axial movement and loss of the motor shaft. Therefore, there is a need for an improved electric submersible motor thrust bearing system.

BRIEF SUMMARY OF THE INVENTION

One or more embodiments of the invention enable an electric submersible motor thrust bearing system.

An electric submersible motor thrust bearing system is described. An illustrative embodiment of an electric submersible motor thrust bearing system includes a thrust bearing assembly carrying a thrust of an electric submersible motor, the thrust bearing assembly including a split ring secured around a shaft of the electric submersible motor inward of a rotatable thrust runner, the rotatable thrust runner coupled around an outer diameter of the split ring and mated above a non-rotatable thrust bearing, the rotatable thrust runner serving as a barrier to radial expansion of the split ring, a lock ring secured to the thrust runner by a threaded connection, at least a portion of the lock ring above the split ring and at least a portion of the thrust runner below the split ring, and the threaded connection securing the split ring axially between the lock ring and the thrust runner. In some embodiments, a base of the rotatable thrust runner is keyed to the shaft below the split ring such that the thrust runner rotates with the shaft, the non-rotatable thrust bearing secured to a housing of a head of the electric submersible motor. In certain embodiments, a series of bronze pads extend around the non-rotatable thrust bearing between the non-rotatable thrust bearing and the rotatable thrust runner. In some embodiments, the threaded connection further includes a tubular extension extending upwards from a base of the rotatable thrust runner, the tubular extension having male threads around an outer diameter of the tubular extension, the lock ring having female threads around an inner diameter of the lock ring, and the male and female threads mated such that rotation of the shaft tightens the threaded connection. In certain embodiments, the tubular extension surrounds the outer diameter of the split ring and the lock ring surrounds the outer diameter of the tubular extension. In some embodiments, the lock ring further includes a top surface extending above the threaded connection and radially between the vertical motor shaft and the outer diameter of the lock ring. In certain embodiments, the top surface serves as a barrier to upward axial movement of the split ring. In certain embodiments, a space extends between the split ring and the top surface. In some embodiments, the threaded connection further includes a tubular extension extending upwards from a base of the rotatable thrust runner, the tubular extension having female threads around an inner diameter of the tubular extension, the lock ring having male threads around an outer diameter of the lock ring, and the male and female threads mated such that rotation of the shaft tightens the threaded connection. In certain embodiments, the lock ring surrounds an outer diameter of the split ring, and the tubular extension surrounds the outer diameter of the lock ring. In some embodiments, the lock ring further includes a shoulder that sandwiches the split ring between the shoulder and a base of the rotatable thrust runner. In certain embodiments, a portion of the lock ring below the shoulder extends around an outer diameter of the split ring. In some embodiments, a plurality of set screws extend axially through the lock ring and engage the thrust runner.

An illustrative embodiment of an electric submersible motor thrust bearing system includes an electric submersible motor operatively coupled to an electric submersible pump, a head of the electric submersible motor supporting a rotatable motor shaft extending below the head, the head including a thrust bearing set including a rotatable thrust runner keyed to the motor shaft opposite a non-rotatable thrust bearing below the thrust runner, the rotatable thrust runner including a base mateable with a series of pads on the non-rotatable thrust bearing, and a tubular extension extending upwards from the base, the tubular extension including a first set of threads, a rotatable lock ring secured one of inside or around the tubular extension, the rotatable lock ring including a second set of threads mated to the first set of threads to form a threaded connection, the threaded connection tightened in a direction of rotation of the motor shaft, and a split ring seated in a groove on the motor shaft inward of the tubular extension of the rotatable thrust runner, the split ring above the base and below at least a portion of the rotatable lock ring. In some embodiments, a plurality of set screws extend axially through the lock ring and engage the thrust runner. In some embodiments, the lock ring further includes a shoulder that extends above the split ring sandwiching the split ring between the shoulder and the base of the thrust runner. In certain embodiments, the rotatable lock ring is secured inside the tubular extension and around the motor shaft, and wherein the first set of threads are female threads and the second set of threads are male threads. In some embodiments, the lock ring surrounds the split ring and the tubular extension of the rotatable thrust runner surrounds the lock ring. In certain embodiments, the tubular extension surrounds the split ring, the rotatable lock ring is secured around the tubular extension, and the first set of threads are male threads and the second set of threads are female threads. In some embodiments, the lock ring further includes engagement apertures on a top of the lock ring, the engagement apertures permitting rotational engagement of the threaded connection. In certain embodiments, the base serves as a barrier to downward axial movement of the split ring and the lock ring serves as a barrier to upward axial movement of the split ring. In some embodiments, the non-rotatable thrust bearing is secured against rotation by a pin engaging a housing of the head. In certain embodiments, the rotatable thrust runner surrounds the split ring and serves as a barrier to radial expansion of the split ring.

An illustrative embodiment of an electric submersible motor thrust bearing system includes a thrust bearing assembly carrying a thrust of an electric submersible motor, the thrust bearing assembly including a split ring secured around a shaft of the electric submersible motor inward of a rotatable thrust runner, the rotatable thrust runner coupled around an outer diameter of the split ring and mated above a non-rotatable thrust bearing, the rotatable thrust runner serving as a barrier to radial expansion of the split ring, a lock ring secured within a recess in the thrust runner, at least a portion of the lock ring above the split ring and at least a portion of the thrust runner below the split ring, and a snap ring securing the split ring axially between the lock ring and the thrust runner. In some embodiments, the rotatable thrust runner includes a tubular extension above a base, the tubular extension forming the recess and including a snap ring groove, the snap ring partially seated in the snap ring groove and partially extending above the lock ring. In certain embodiments, the lock ring surrounds the split ring, and the tubular extension surrounds the lock ring.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 14 is an exploded view of a thrust bearing assembly of an illustrative embodiment.

Figure 1:
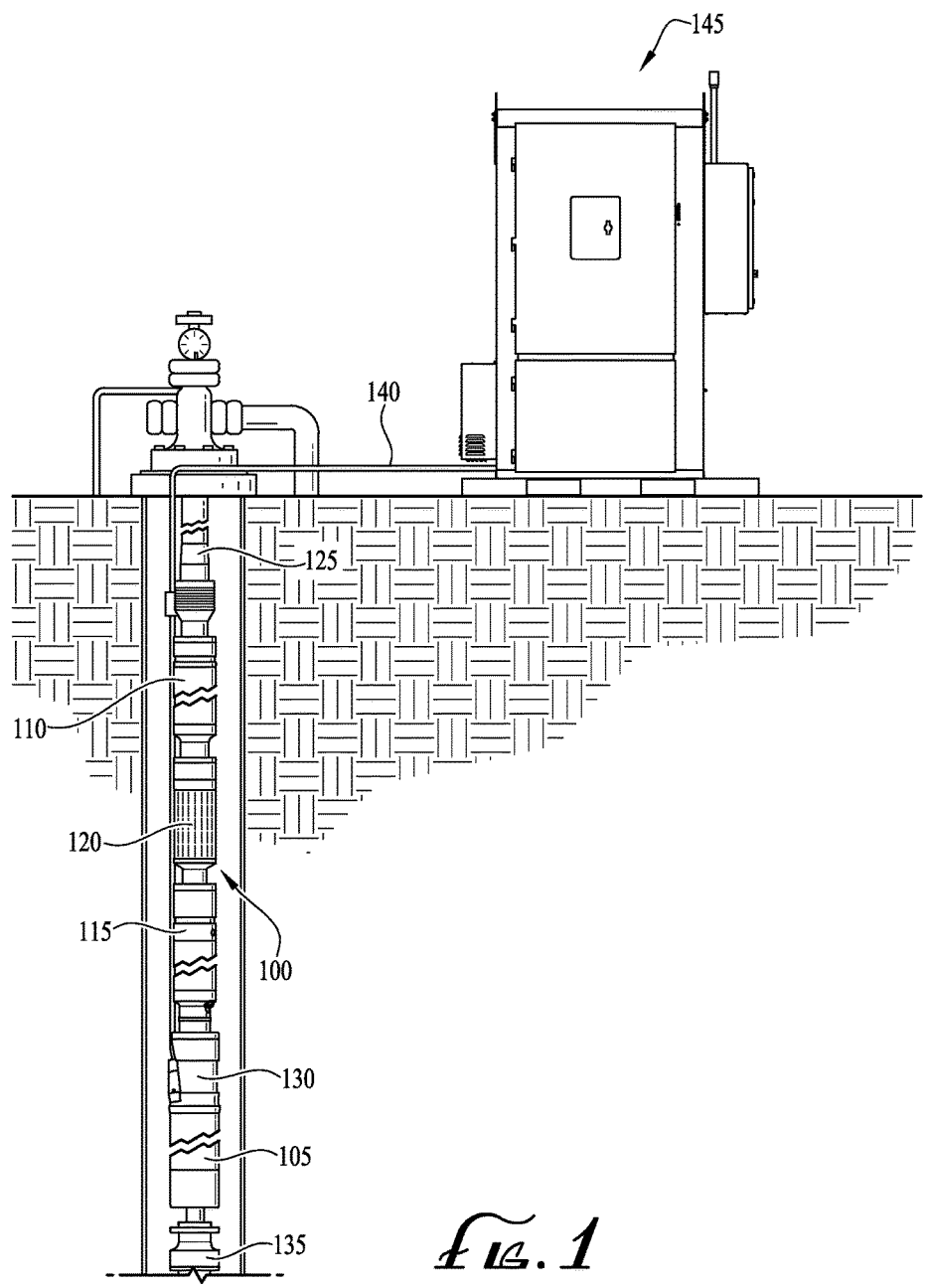
FIG. 1 is a perspective view of an electric submersible pump assembly of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

An electric submersible motor thrust bearing system is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a thread includes one or more threads.

As used in this specification and the appended claims, "coupled" refers to either a direct connection or an indirect connection (e.g., at least one intervening connection) between one or more objects or components. The phrase "directly attached" means a direct connection between objects or components.

As used in this specification and the appended claims, "downstream" or "upwards" refer interchangeably to the longitudinal direction substantially with the principal flow of lifted fluid when the pump assembly is in operation. By way of example but not limitation, in a vertical downhole ESP assembly, the downstream direction may be towards the surface of the well. The "top" of an element refers to the downstream-most side of the element, without regard to whether the element is oriented horizontally, vertically or extends through a radius. "Above" refers to an element located further downstream than the element to which it is compared.

As used in this specification and the appended claims, "upstream" or "downwards" refer interchangeably to the longitudinal direction substantially opposite the principal flow of lifted fluid when the pump assembly is in operation. By way of example but not limitation, in a vertical downhole ESP assembly, the upstream direction may be opposite the surface of the well. The "bottom" of an element refers to the upstream-most side of the element, without regard to whether the element is oriented horizontally, vertically or extends through a radius. "Below" refers to an element located further upstream than the element to which it is compared.

As used herein, the term "outer," "outside" or "outward" mean the radial direction away from the center of the shaft of the electric submersible pump (ESP) assembly component and/or the opening of a component through which the shaft would extend. In the art, the "outer diameter" is used to refer to the outer circumference or outer surface of a tube-shaped or annular object, such as a bearing or ring.

As used herein, the term "inner", "inside" or "inward" means the radial direction toward the center of the shaft of the ESP assembly component and/or the opening of a component through which the shaft would extend. In the art, the "inner diameter" is used to refer to the inner circumference or inner surface of a tube-shaped or annular object, such as a bearing or ring.

As used herein the terms "axial", "axially", "longitudinal" and "longitudinally" refer interchangeably to the direction extending along the length of the shaft of the ESP motor.

For ease of description, the illustrative embodiments described herein are described in terms of an electric submersible pump (ESP) assembly operating in a downhole oil or gas well. However, illustrative embodiments are not so limited and may be equally applied to any hydrodynamic thrust bearing secured around a rotatable shaft and carrying high axial loads (e.g., 2,000 pounds), where it is desirable to prevent axial movement of the shaft.

Illustrative embodiments may prevent axial movement and loss of an ESP motor shaft. Illustrative embodiments may prevent a split ring, which holds a thrust bearing assembly axially in place on the motor shaft, from expanding radially out of its shaft groove and then sliding axially along the motor shaft. Illustrative embodiments may secure the split ring inward of the thrust runner, and secure the lock ring to the thrust runner by thread and/or snap ring, eliminating problematic bolts that tend to back out and sheer. Illustrative embodiments may prevent the ESP motor shaft from dropping through and falling out of the motor.

Illustrative embodiments include a thrust bearing assembly that carries thrust of an electric submersible motor. The thrust bearing assembly may include a lock ring secured to a thrust runner by a threaded connection and/or snap ring. The thrust runner may surround a split ring seated within a groove on the ESP motor shaft. The threaded connection and/or snap ring may capture the split ring radially inside the thrust runner, and axially between the lock ring and the thrust runner, preventing unseating and/or axial movement of the split ring. The thrust runner may include a tubular extension that extends upwards from a base of the thrust runner, the tubular extension may include male or female threads that mate with threads on the lock ring. The threaded connection may tighten in the direction of rotation of the vertical motor shaft.

FIG. 1 illustrates an ESP assembly including an electric submersible motor of illustrative embodiments. ESP assembly 100 may be downhole in a well, such as an oil or gas well. ESP assembly 100 may be vertical and/or extend through a radius. In some embodiments, ESP assembly 100 may be horizontally arranged within the downhole well. ESP assembly may include electric motor 105. Electric submersible motor 105 may be a two-pole, three-phase squirrel cage induction motor that operates to turn the shaft of ESP pump 110. ESP pump 110 may be a multi-stage centrifugal pump with stacked impeller and diffuser stages. Seal section 115 may protect electric motor 105 from the ingress of well fluid and may equalize pressure inside motor 105. Intake 120 may serve as the intake for fluid to ESP pump 110. Production tubing 125 may carry lifted fluid to the surface of the well. ESP motor head 130 may be bolted to seal section 115, with the weight of the remainder of motor 105, including the motor shaft and rotor sections, hanging from head 130. Downhole sensors 135 may also hang below motor head 130. Motor head 130 may include a thrust bearing assembly to carry thrust loads and a power connection that receives ESP power cable 140 and/or a motor lead extension. ESP power cable 140 may obtain power from a surface power source inside cabinet 145. Cabinet 145 may also house a variable frequency drive (VFD) and/or VFD controller that operates electric motor 105 by providing and/or varying input voltage and/or current to ESP motor 105.

Figure 2:
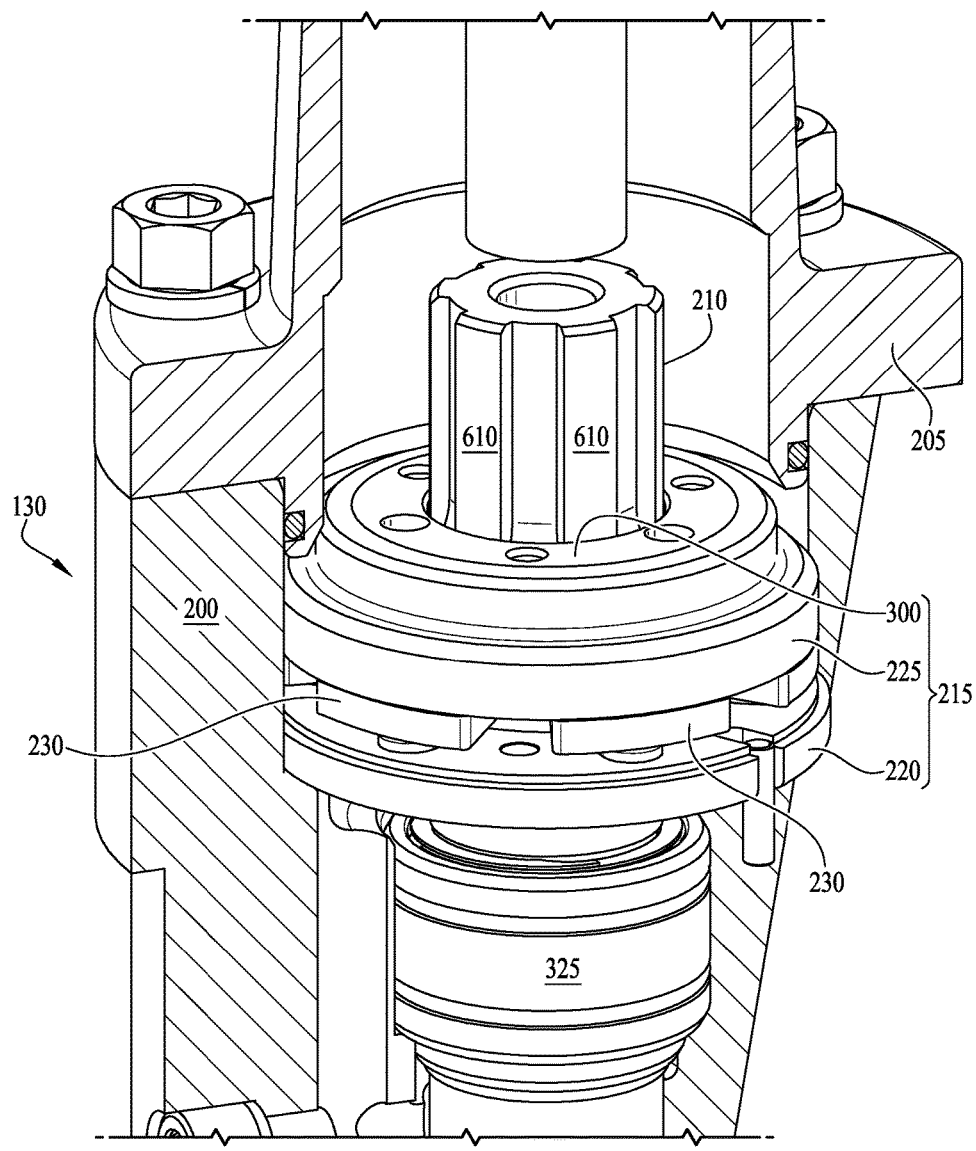
FIG. 2 is a perspective view of a motor head of an illustrative embodiment.
Figure 11:
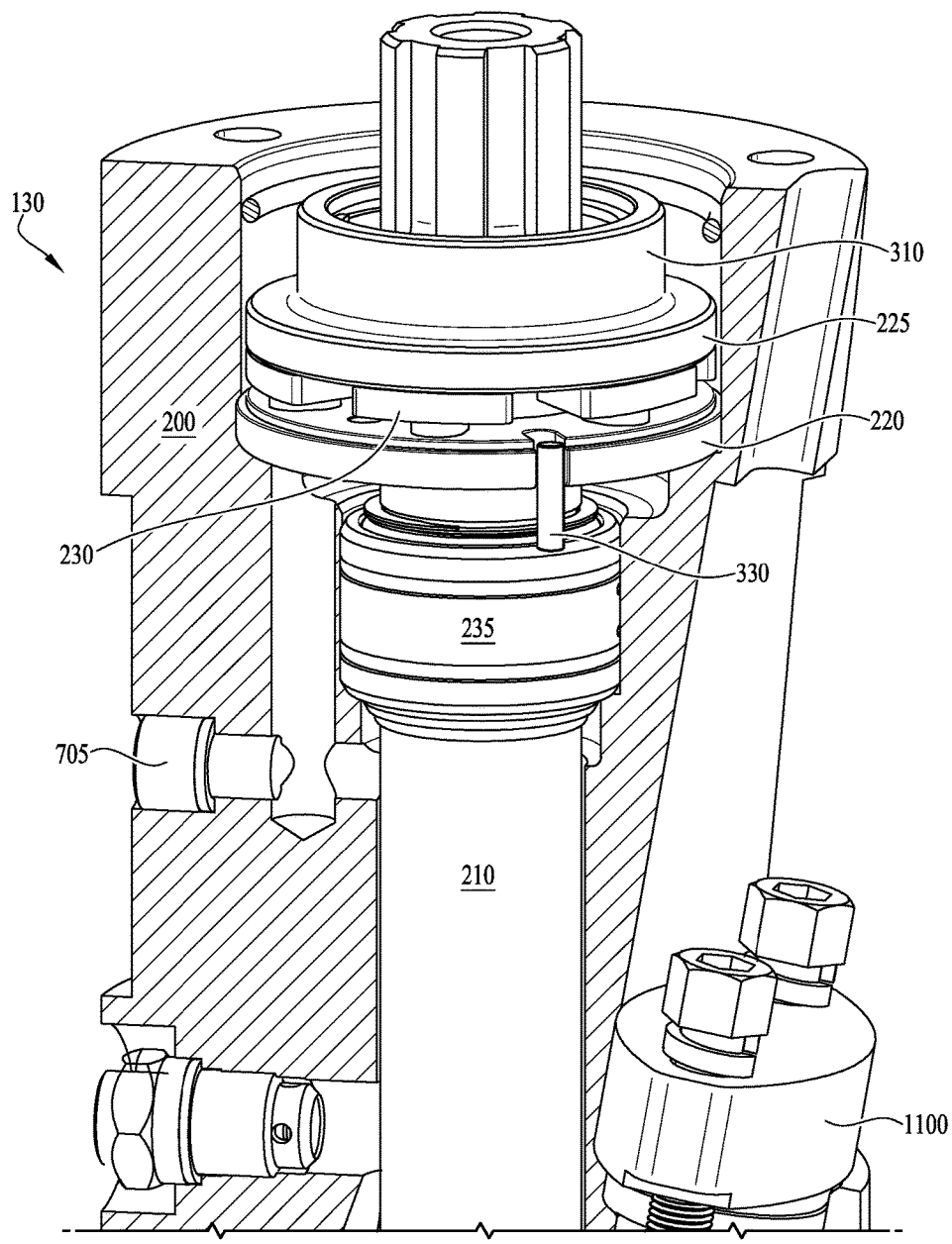
FIGS. 11-12 are perspective views of a thrust bearing assembly of an illustrative embodiment.
Figure 12:
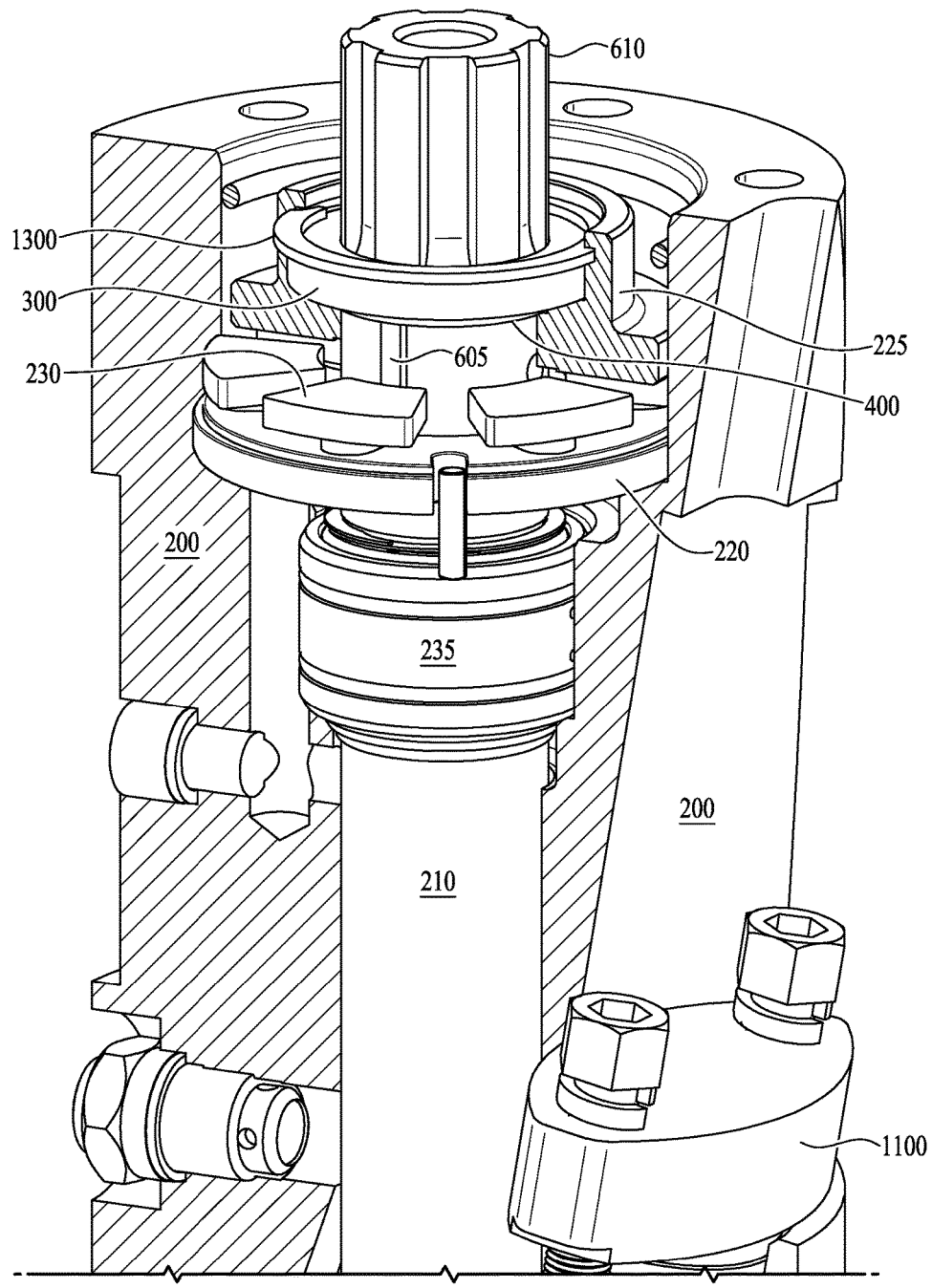

FIG. 2 illustrates motor head 130 with a thrust bearing assembly of illustrative embodiments. Housing 200 of motor head 130 may be bolted to flanged adapter 205 that connects motor head 130 to seal section 115. Head 130 may also include power connection 1100 (shown in FIG. 11) for connection of motor 105 to power cable 140 and/or a motor lead extension and/or power source. Motor shaft 210 may extend centrally and longitudinally through motor 105 and motor head 130, with the majority of the length of motor shaft 210 extending below motor head 130. Motor shaft 210 may include splines 610 for connection to the shaft of seal section 115 above motor shaft 210, and motor shaft 210 may be hollow to allow motor oil to flow through motor shaft 210. Thrust bearing assembly 215 may be included in motor head 130 and carry thrust loads, such as the weight of motor shaft 210, motor rotor sections (not shown) and downhole sensors 135 all hanging below motor head 130. Thrust bearing assembly 215 may be within motor head 130 and/or may extend partially into adapter 205. Thrust bearing assembly 215 may include a hydrodynamic bearing set that contains, consists of and/or includes non-rotating thrust bearing 220 and rotatable thrust runner 225. Thrust bearing 220 may be seated on housing 200 of head 130 and/or pinned against rotation to housing 200 of head 130. Pin 330 may engage thrust bearing 220 and housing 200 and may prevent rotation of thrust bearing 220. A series of bronze pads 230 may be dispersed around thrust bearing 220, between thrust bearing 220 and thrust runner 225. Thrust bearing 220 and thrust runner 225 may each be annular and surround shaft 210. Thrust runner 225 may be keyed and/or secured to shaft 210 such that thrust runner rotates with shaft 210. Motor oil provided by an oil port in the hollow motor shaft 210 may lubricate the space between thrust runner 225 and thrust bearing, allowing a hydrodynamic fluid film to form between thrust bearing 220 and thrust runner 225.

Figure 3:
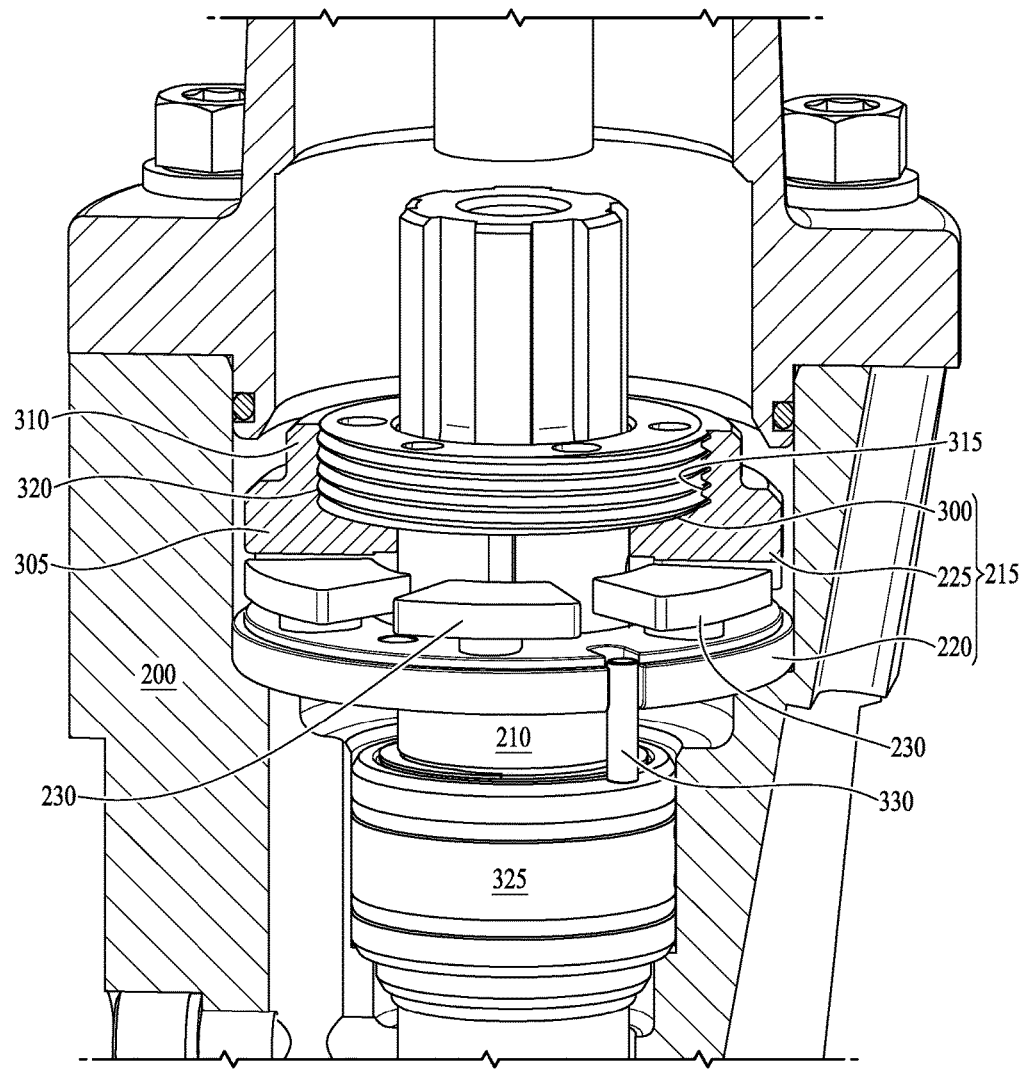
FIG. 3 is a perspective view of a thrust bearing assembly of an illustrative embodiment.

Turning to FIG. 3, lock ring 300 may be threaded to thrust runner 225. FIG. 3 illustrates an embodiment where thrust runner 225 has female threads and lock ring 300 has male threads. Thrust runner 225 may include base 305 and tubular extension 310. Base 305 may oppose and/or mate with thrust bearing 220 and/or be adjacent to bronze pads 230. Tubular extension 310 may extend upward above base 305, may be tubular and/or a hollow cylinder and may surround lock ring 300. The inner diameter of tubular extension 310 may include runner threads 315, and the outer diameter of lock ring 300 may include lock ring threads 320. Runner threads 315 may receive lock ring threads 320 to form a threaded connection between lock ring 300 and thrust runner 225. Threaded connection between runner threads 315 and lock ring threads 320 may include fine threads and/or 5-7 threads of engagement. In some embodiments, threaded connection may be buttress threads. As shown in FIG. 3, when threadedly engaged, lock ring 300 may sit within and/or inside thrust runner 225 and/or tubular extension 310, above base 305 of thrust runner 225. Thrust runner 225 and/or lock ring may be machined and/or formed from high strength stainless steel. Radial bearing 325 may provide radial support to motor shaft 210 below thrust bearing assembly 215.

Figure 4:
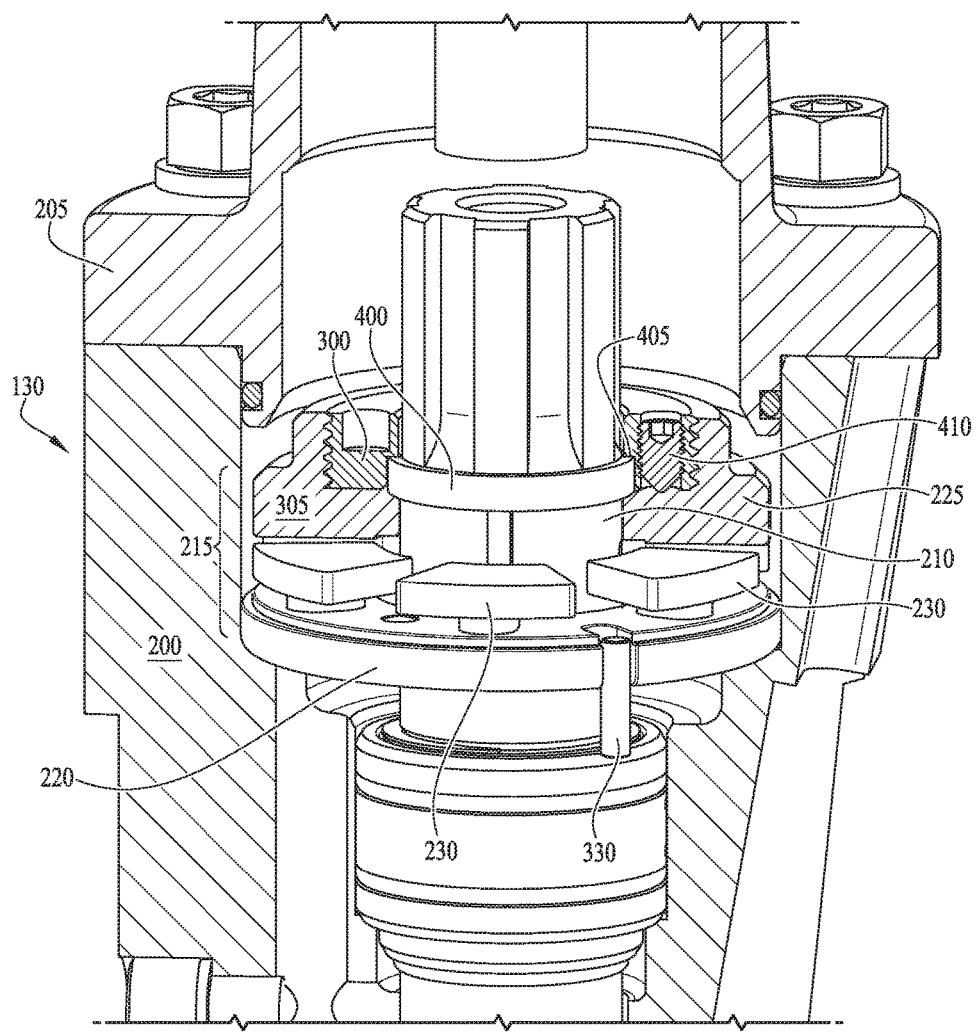
FIG. 4 is a cross-sectional perspective view of a thrust bearing assembly of an illustrative embodiment.

Turning to FIG. 4, split ring 400 may hold thrust bearing assembly 215 in place axially on motor shaft 210. Split ring 400 may be "split" and/or formed of two or more pieces that connect together around shaft 210 to form a ring shape. Split ring 400 may be similar to a key but extending circumferentially around shaft 210, rather than axially along shaft 210. Split ring 400 may be seated within split ring groove 600 (shown in FIG. 6) around motor shaft 210, just below and/or adjacent to splines 610 at the top of motor shaft 210. Thrust runner 225 may be positioned such that base 305 extends around motor shaft 210 below split ring 400. Base 305 may be keyed and/or secured to shaft 210 below split ring 400, such that thrust runner 225 rotates with shaft. Tubular extension 310 may surround and/or be outward of split ring 400. Tubular extension 310 may serve as a direct or indirect barrier to radial expansion of split ring 400. As shown in FIG. 4, lock ring 300 is threaded within thrust runner 225 and surrounds split ring 400, and tubular extension 310 of thrust runner 225 surrounds lock ring 300. Lock ring 300 may include a lock ring groove or shoulder 405 that extends over and/or above the top of split ring 400. Lock ring 300 may be sandwiched above base 305 of thrust runner 225 and below shoulder 405 of lock ring 300. In some embodiments, one or more set screws 410 may optionally extend axially through apertures 415 (shown in FIG. 6) in lock ring 300 and engage base 305 of thrust runner 225, which may further secure and/or prevent backing off of lock ring 300.

Figure 5:
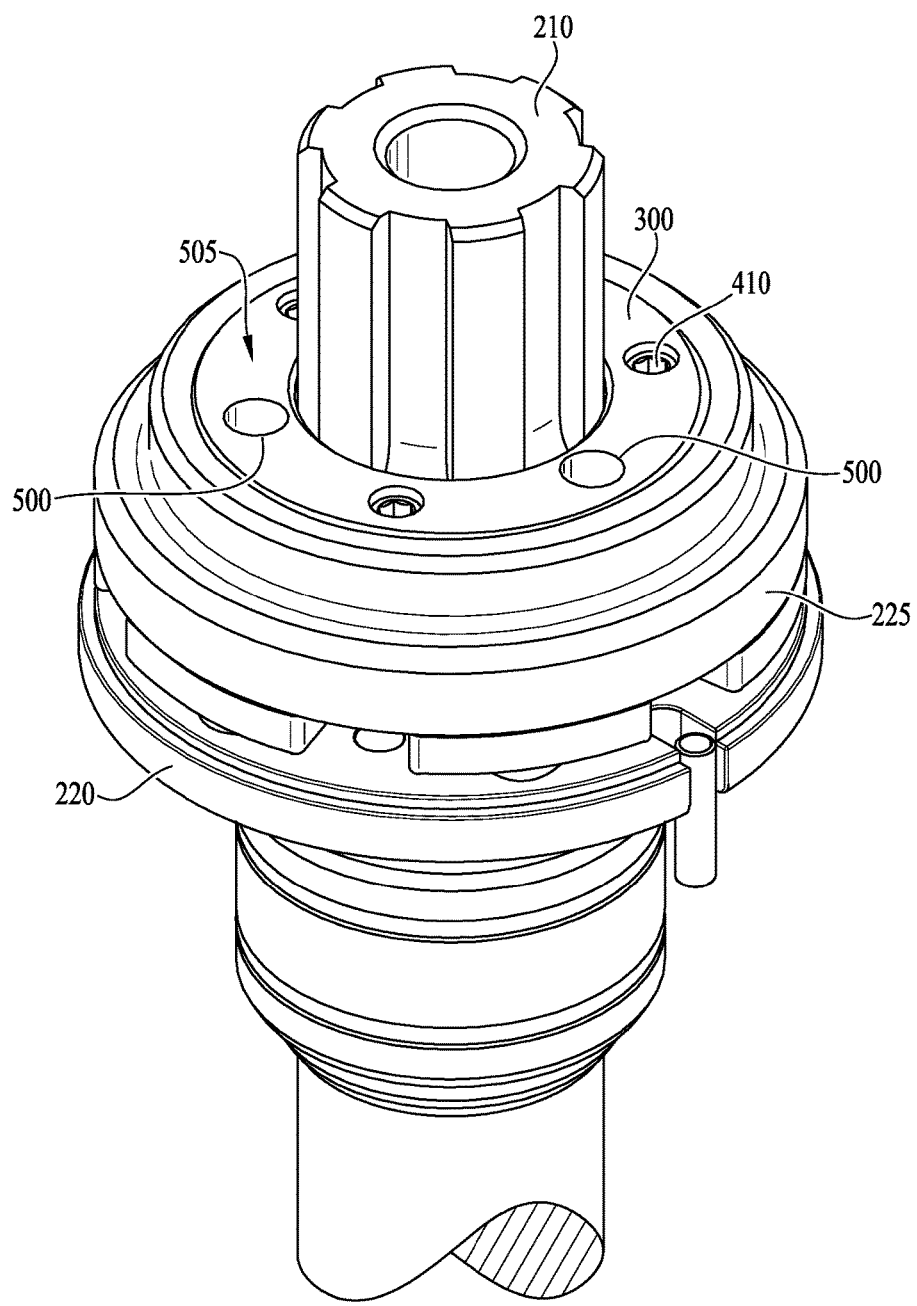
FIG. 5 is a perspective view of a thrust bearing assembly of an illustrative embodiment.
Figure 6:
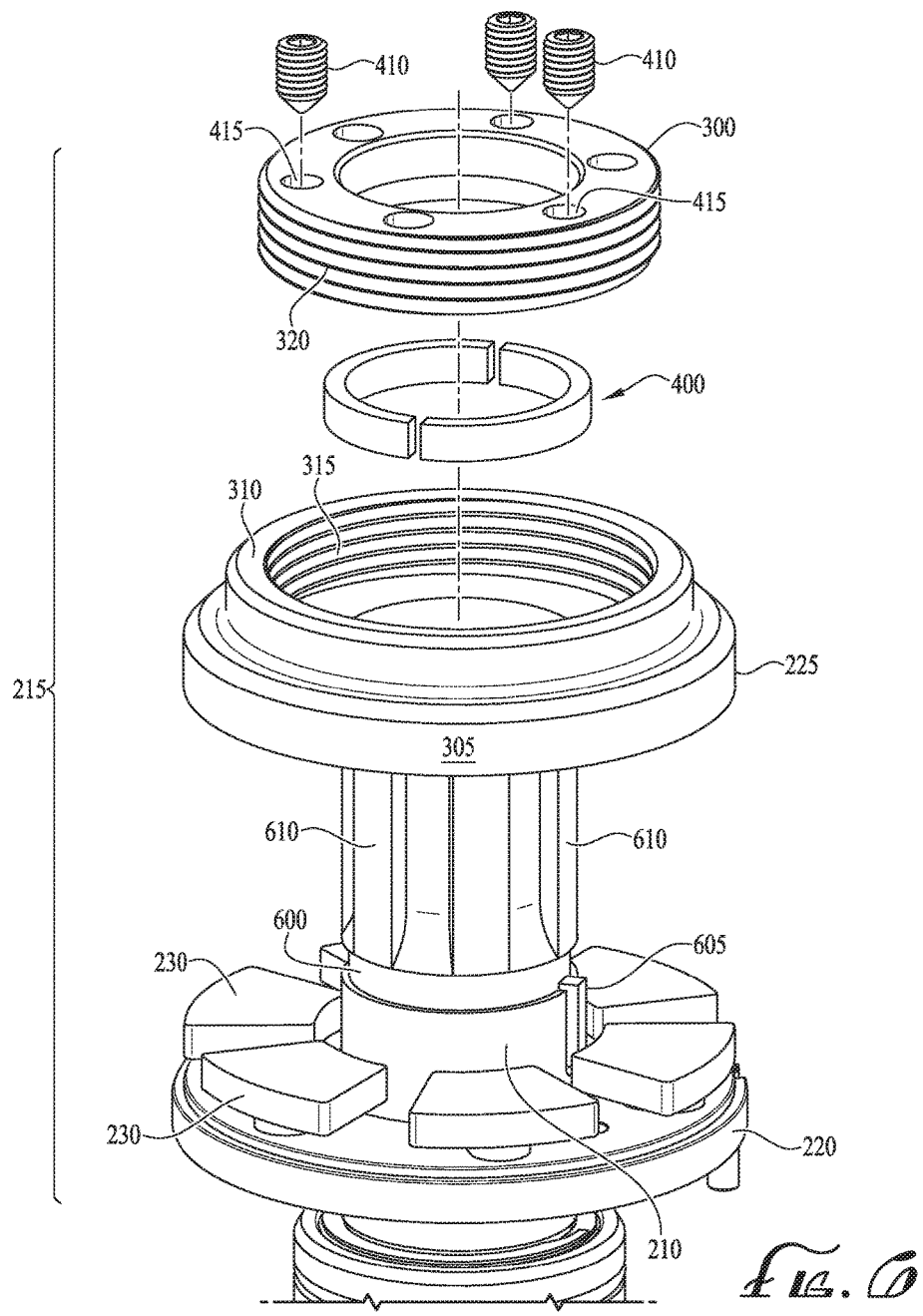
FIG. 6 is an exploded view of a thrust bearing assembly of an illustrative embodiment.

FIG. 5 and FIG. 6 illustrate three set screws dispersed circumferentially around threaded lock ring 300, engaging with thrust runner 225. As shown in FIG. 5, when threaded to thrust runner 225, the top surface of lock ring 300 may be flush or substantially thrust with the top surface of thrust runner 225 in embodiments where lock ring 300 threads inside thrust runner 225. Top surface of lock ring 300 may also include engagements holes 500. Engagement holes 500 may be holes or recesses to allow a tool and/or operator to grasp lock ring 300 and rotate lock ring 300 in order to thread lock ring 300 to thrust runner 225.

FIG. 6 illustrates an exploded view of thrust bearing assembly 215 showing split ring groove 600 in which split ring 400 may be seated. Split ring groove 600 may be positioned directly below and/or adjacent to splines 610 and/or splined portion of motor shaft 210. Base 305 of thrust runner 225 may be keyed to shaft 210 by key 605 that extends longitudinally along motor shaft 210 below split ring groove 600. Keyway 1405 (shown in FIG. 14) on the inner diameter of base 305 of thrust runner 225 may mate with key 605 to allow thrust runner 225 and attached lock ring 300 to rotate with shaft 210. As shown in FIG. 6, tubular extension 310 of thrust runner 225 may form a recess and/or receptacle for lock ring 300 that may fit inside tubular extension 310 secured by threaded connection between lock ring threads 320 and thrust runner threads 315.

Figure 7:
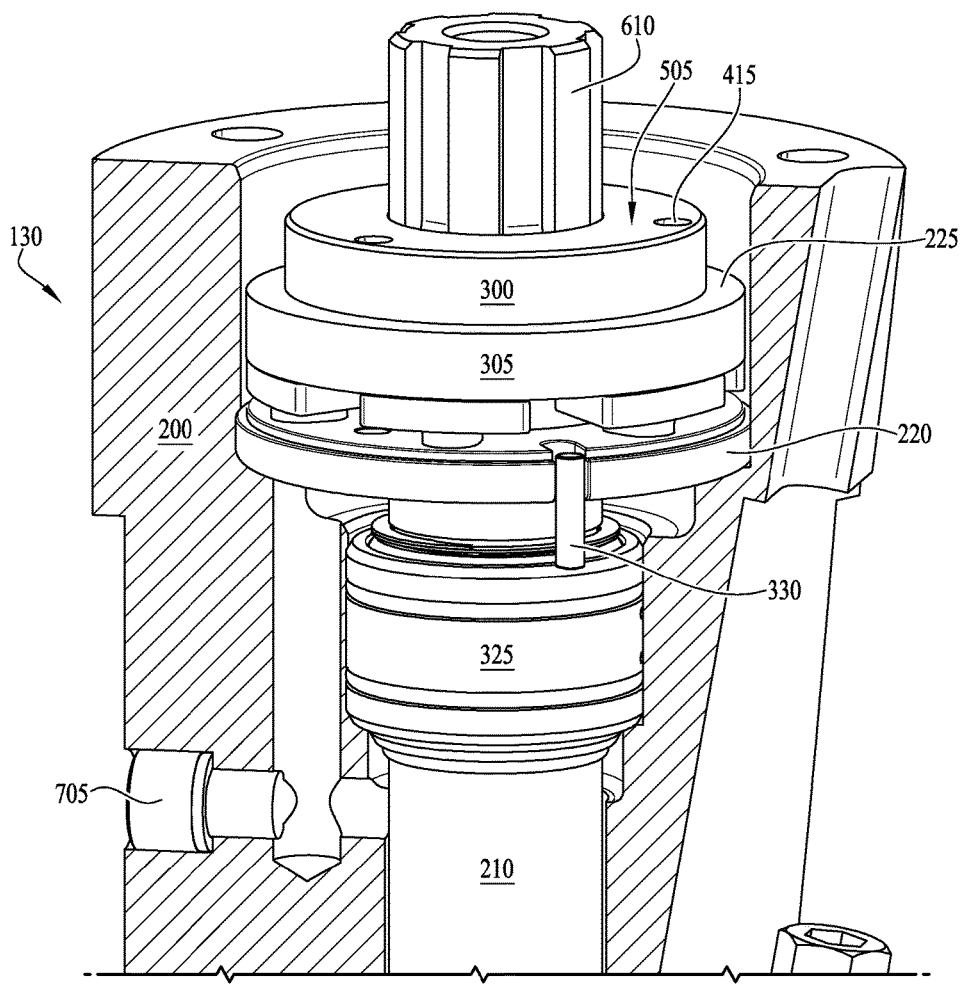
FIGS. 7-8 are a perspective views of a motor head of an illustrative embodiment.
Figure 8:
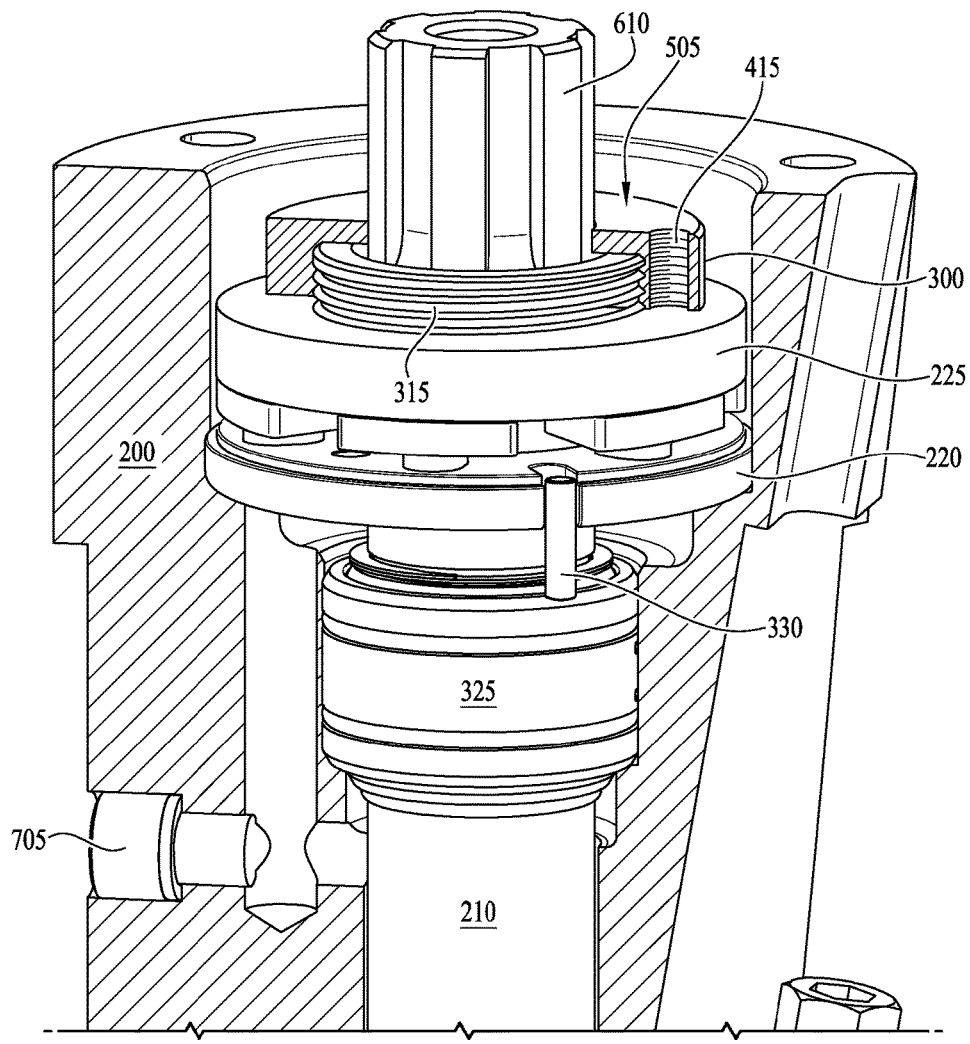
Figure 9:
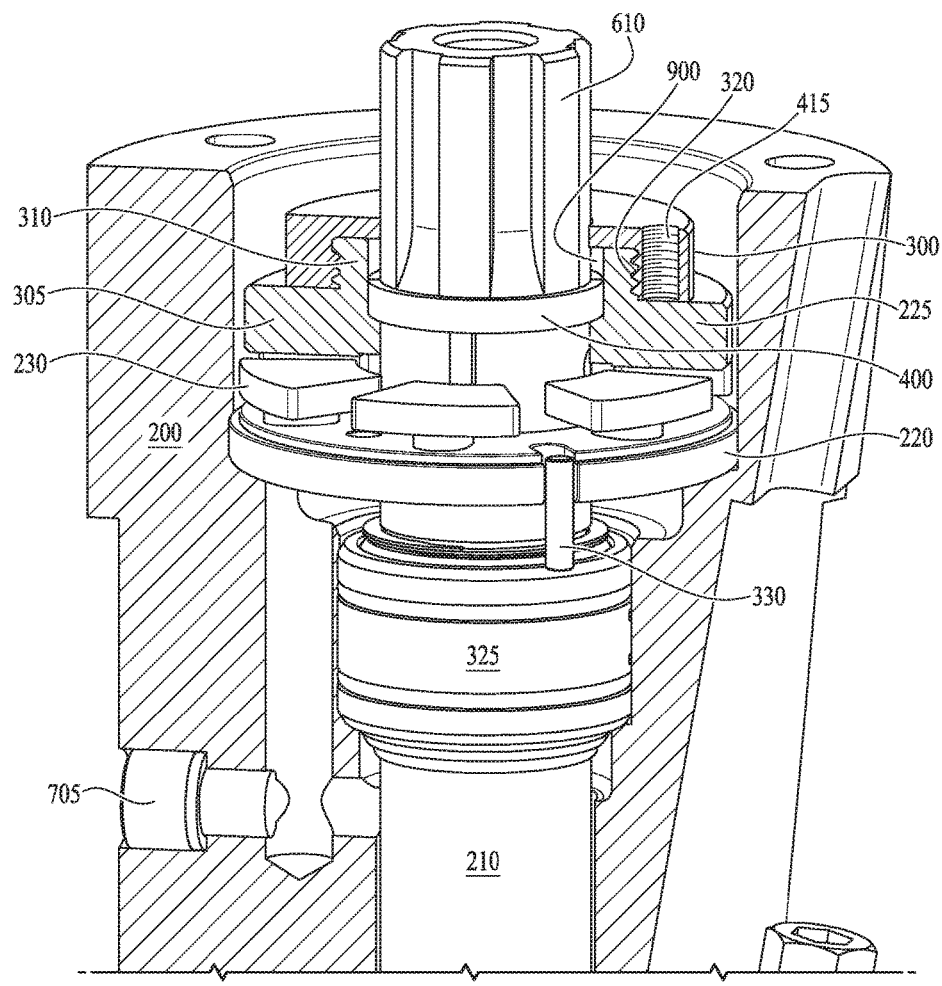
FIG. 9 is a cross-sectional perspective view of a motor head of an illustrative embodiment.
Figure 10:
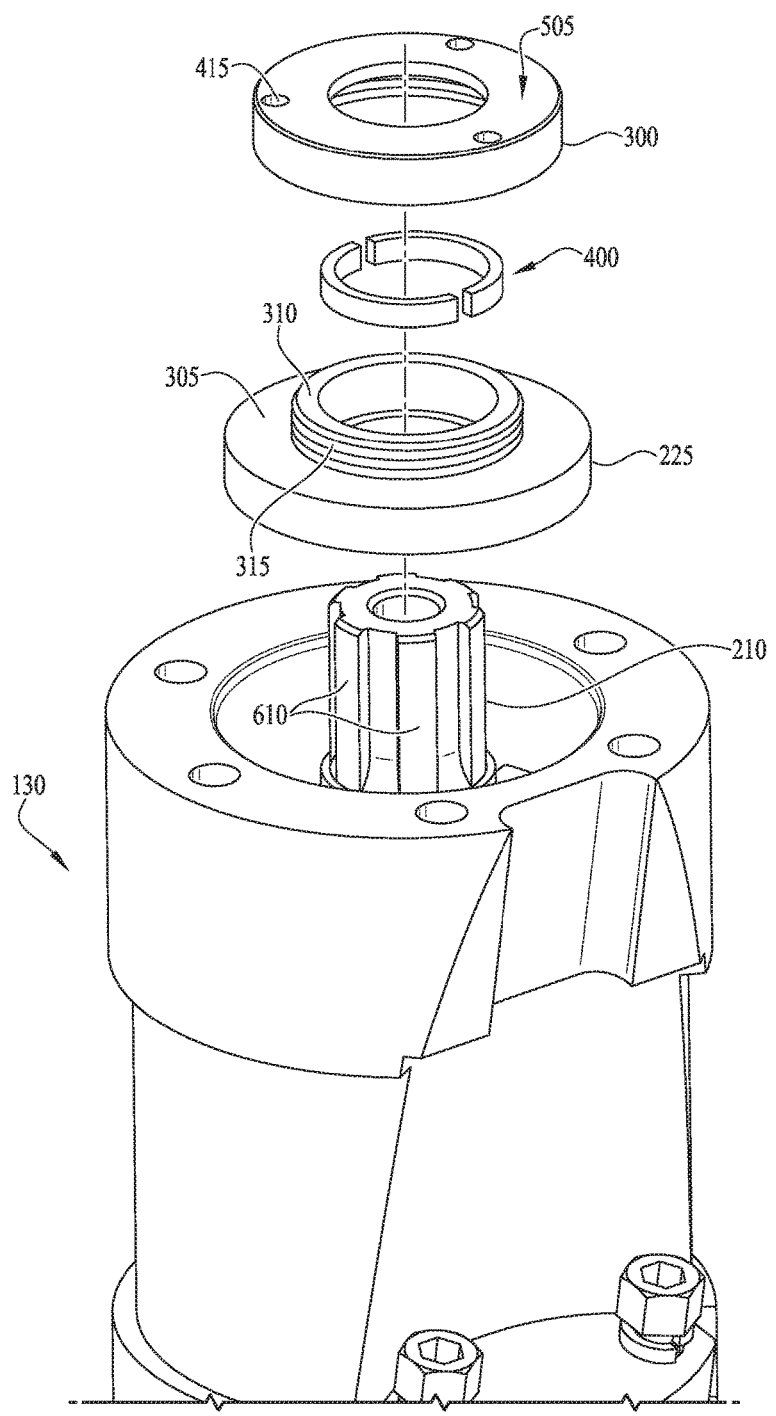
FIG. 10 is an exploded view of a thrust bearing assembly of an illustrative embodiment.

FIG. 7-FIG. 10 illustrate an embodiment of thrust bearing assembly 215 where thrust runner 225 has male threads and lock ring 300 has female threads. As shown in FIG. 8 and FIG. 9, outer diameter of tubular extension 310 of thrust runner 225 may include runner threads 315, and inner diameter of lock ring 300 may include lock ring threads 320. Lock ring 300 may include lock ring threads 320 on inner diameter of lock ring 300 and top surface 505 of lock ring 300 may extend over the top of lock ring 300. Top surface 505 may be a cover plate, and/or may be annular, surrounding shaft 210 and extending outward from shaft 210 to at least the inner diameter of lock ring 300, extending from shaft 210 to the outer diameter of lock ring 300 and/or extending between the inner and outer diameter of lock ring 300. When lock ring 300 is threaded to thrust runner 225 with internal lock ring threads 320, top surface 505 may extend above the threaded connection and/or above tubular extension 310. Drain plug 705 is shown in FIG. 7 and may allow motor oil to be drained from motor head 130 when ESP motor 105 is not in use.

Turning to FIG. 9, split ring 400 may be positioned inward of thrust runner 225 and/or inward of tubular extension 310. In FIG. 9, split ring 400 is shown directly inward, contacting and/or adjacent to thrust runner 225 and/or tubular extension 310, such that thrust runner 225 and/or tubular extension prevents radial expansion of split ring 400. Lock ring 300 extends outward of tubular extension 310 and above thrust runner 225. Base 305 is positioned below split ring 400 and may prevent downward movement of split ring 400. Top surface 505 may serve as a barrier to upward movement of split ring 400. A space 900 may extend axially between split ring 400 and top surface 505. Split ring 400 may be prevented from sliding into space 900 since thrust runner 225 and/or tubular extension 310 may block split ring 400 from expanding radially out of split ring groove 600 in shaft 210. However, in the unlikely instance split ring 400 were to dislodge, top surface 505 may sufficiently limit axial movement of split ring 400 to prevent shaft 210 fall out.

Figure 13:
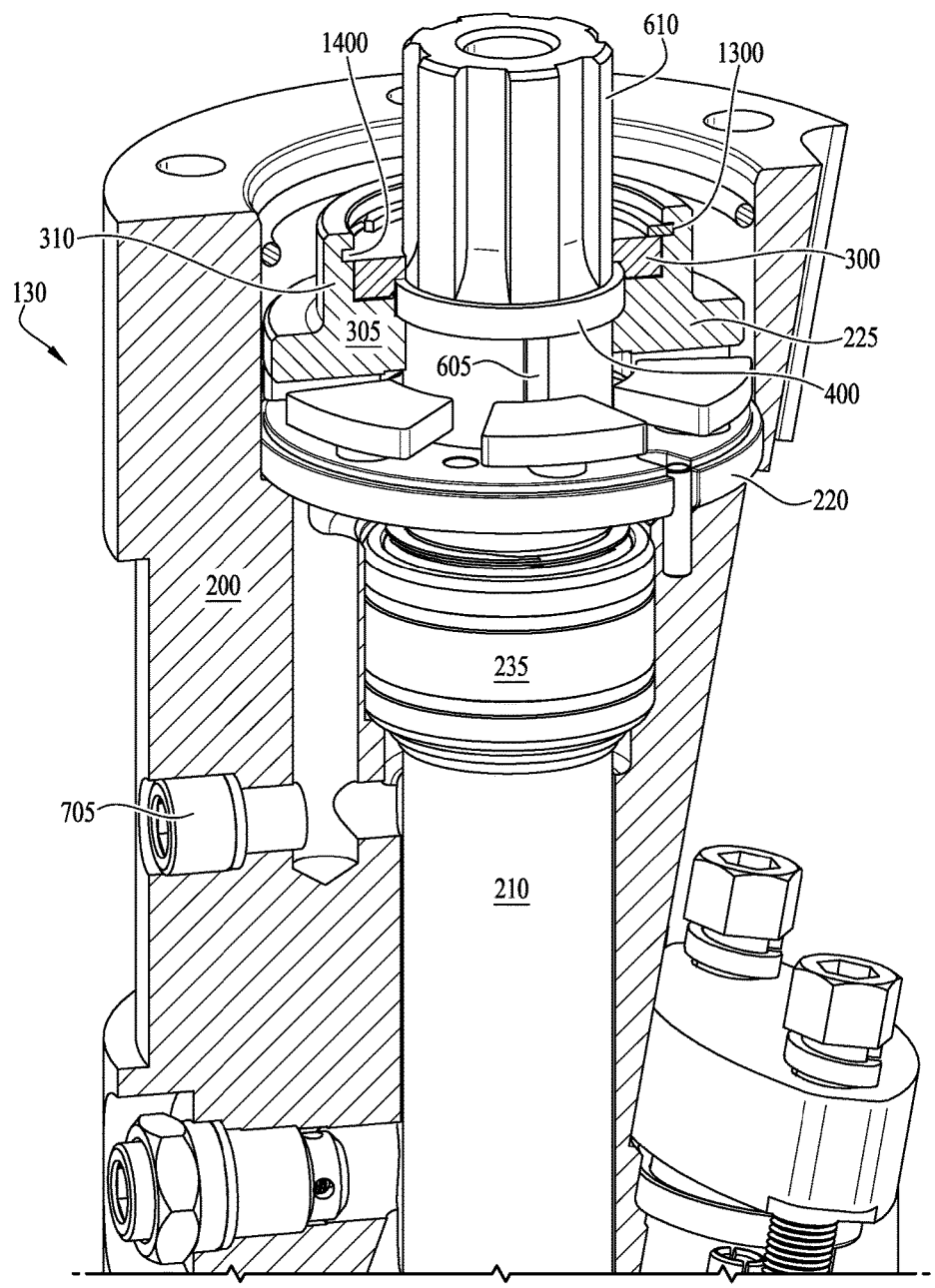
FIG. 13 is a cross-sectional perspective view of a thrust bearing assembly of an illustrative embodiment.

In some embodiments, rather than or in addition to lock ring 300 attached to thrust runner 225 by threaded connection, lock ring 300 and/or split ring 400 may be held in place and/or secured to thrust runner 225 by a snap ring. FIG. 11-FIG. 14 illustrate thrust bearing assembly 215 employing exemplary snap ring 1300. Turning to FIG. 13, lock ring 300 may sit within and/or inside of tubular extension 310 of thrust runner 225. Split ring 400 may be captured within lock ring 300 and thrust runner 225. In the embodiment shown in FIG. 13, lock ring 300 extends outward of top portion of split ring 400, and thrust runner base 305 extends directly outward of bottom portion of split ring 400. Tubular portion 310 extends outward of lock ring 300 and indirectly outward of split ring 400. Tubular portion 310 of thrust runner may include a snap ring groove 1400 proximate and/or near the top of tubular portion. Snap ring 1300 may be snapped and/or seated into snap ring groove 1400 to firmly secure, sandwich, squeeze and/or hold lock ring 300 in position within recess of thrust runner 225. Snap ring 1300 may extend partially into snap ring groove 1400 on an outward side (outer diameter) and partially over the top of lock ring 300 on an inward side (inner diameter), which may prevent upward movement of lock ring 300 with respect to thrust runner 225. As shown in FIG. 14, snap ring 1300 may be a semi-flexible metal ring with open ends, such as a circlip, c-clip, Seeger ring or another similar fastener or retaining ring that permits rotation of lock ring 300 while preventing axial movement. Snap ring 1300 may be used instead of threads 315, 320 or in addition to threads 315, 320.

An electric submersible motor thrust bearing system has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An electric submersible motor thrust bearing system comprising:
    a thrust bearing assembly carrying a thrust of an electric submersible motor, the thrust bearing assembly comprising:
        a split ring secured around a shaft of the electric submersible motor inward of a rotatable thrust runner;
        the rotatable thrust runner coupled around an outer diameter of the split ring and mated above a non-rotatable thrust bearing, the rotatable thrust runner serving as a barrier to radial expansion of the split ring;
        a lock ring secured to the thrust runner by a threaded connection, at least a portion of the lock ring above the split ring and at least a portion of the thrust runner below the split ring; and
        the threaded connection securing the split ring axially between the lock ring and the thrust runner.

2. The electric submersible motor thrust bearing system of claim 1, wherein a base of the rotatable thrust runner is keyed to the shaft below the split ring such that the thrust runner rotates with the shaft, the non-rotatable thrust bearing secured to a housing of a head of the electric submersible motor.

3. The electric submersible motor thrust bearing system of claim 2, wherein a series of bronze pads extend around the non-rotatable thrust bearing between the non-rotatable thrust bearing and the rotatable thrust runner.

4. The electric submersible motor thrust bearing system of claim 1, wherein the threaded connection further comprises:
    a tubular extension extending upwards from a base of the rotatable thrust runner, the tubular extension having male threads around an outer diameter of the tubular extension;
    the lock ring having female threads around an inner diameter of the lock ring; and
    the male and female threads mated such that rotation of the shaft tightens the threaded connection.

5. The electric submersible motor thrust bearing system of claim 4, wherein the tubular extension surrounds the outer diameter of the split ring and the lock ring surrounds the outer diameter of the tubular extension.

6. The electric submersible motor thrust bearing system of claim 4, wherein the lock ring further comprises a top surface extending above the threaded connection and radially between the vertical motor shaft and the outer diameter of the lock ring.

7. The electric submersible motor thrust bearing system of claim 6, wherein the top surface serves as a barrier to upward axial movement of the split ring.

8. The electric submersible motor thrust bearing system of claim 7, wherein a space extends between the split ring and the top surface.

9. The electric submersible motor thrust bearing system of claim 1, wherein the threaded connection further comprises:
    a tubular extension extending upwards from a base of the rotatable thrust runner, the tubular extension having female threads around an inner diameter of the tubular extension;
    the lock ring having male threads around an outer diameter of the lock ring; and
    the male and female threads mated such that rotation of the shaft tightens the threaded connection.

10. The electric submersible motor thrust bearing system of claim 9, wherein the lock ring surrounds an outer diameter of the split ring, and the tubular extension surrounds the outer diameter of the lock ring.

11. The electric submersible motor thrust bearing system of claim 9, wherein the lock ring further comprises a shoulder that sandwiches the split ring between the shoulder and a base of the rotatable thrust runner.

12. The electric submersible motor thrust bearing system of claim 11, wherein a portion of the lock ring below the shoulder extends around an outer diameter of the split ring.

13. The electric submersible motor thrust bearing system of claim 1, further comprising a plurality of set screws extending axially through the lock ring and engaging the thrust runner.

14. An electric submersible motor thrust bearing system comprising:
    an electric submersible motor operatively coupled to an electric submersible pump;
    a head of the electric submersible motor supporting a rotatable motor shaft extending below the head, the head comprising:
        a thrust bearing set comprising a rotatable thrust runner keyed to the motor shaft opposite a non-rotatable thrust bearing below the thrust runner, the rotatable thrust runner comprising:
            a base mateable with a series of pads on the non-rotatable thrust bearing; and
            a tubular extension extending upwards from the base, the tubular extension comprising a first set of threads;
        a rotatable lock ring secured one of inside or around the tubular extension, the rotatable lock ring comprising a second set of threads mated to the first set of threads to form a threaded connection;
        the threaded connection tightened in a direction of rotation of the motor shaft; and
        a split ring seated in a groove on the motor shaft inward of the tubular extension of the rotatable thrust runner, the split ring above the base and below at least a portion of the rotatable lock ring.

15. The electric submersible motor thrust bearing system of claim 14, further comprising a plurality of set screws extending axially through the lock ring and engaging the thrust runner.

16. The electric submersible motor thrust bearing system of claim 14, wherein the lock ring further comprises a shoulder that extends above the split ring sandwiching the split ring between the shoulder and the base of the thrust runner.

17. The electric submersible motor thrust bearing system of claim 14, wherein the rotatable lock ring is secured inside the tubular extension and around the motor shaft, and wherein the first set of threads are female threads and the second set of threads are male threads.

18. The electric submersible motor thrust bearing system of claim 17, wherein the lock ring surrounds the split ring and the tubular extension of the rotatable thrust runner surrounds the lock ring.

19. The electric submersible motor thrust bearing system of claim 14, wherein the tubular extension surrounds the split ring, the rotatable lock ring is secured around the tubular extension, and the first set of threads are male threads and the second set of threads are female threads.

20. The electric submersible motor thrust bearing system of claim 14, wherein the lock ring further comprises engagement apertures on a top of the lock ring, the engagement apertures permitting rotational engagement of the threaded connection.

21. The electric submersible motor thrust bearing system of claim 14, wherein the base serves as a barrier to downward axial movement of the split ring and the lock ring serves as a barrier to upward axial movement of the split ring.

22. The electric submersible motor thrust bearing system of claim 14, wherein the non-rotatable thrust bearing is secured against rotation by a pin engaging a housing of the head.

23. The electric submersible motor thrust bearing system of claim 14, wherein the rotatable thrust runner surrounds the split ring and serves as a barrier to radial expansion of the split ring.

24. An electric submersible motor thrust bearing system comprising:
    a thrust bearing assembly carrying a thrust of an electric submersible motor, the thrust bearing assembly comprising:
        a split ring secured around a shaft of the electric submersible motor inward of a rotatable thrust runner;
        the rotatable thrust runner coupled around an outer diameter of the split ring and mated above a non-rotatable thrust bearing, the rotatable thrust runner serving as a barrier to radial expansion of the split ring;
        a lock ring secured within a recess in the thrust runner, at least a portion of the lock ring above the split ring and at least a portion of the thrust runner below the split ring; and
        a snap ring securing the split ring axially between the lock ring and the thrust runner.

25. The electric submersible motor thrust bearing system of claim 24, wherein the rotatable thrust runner comprises a tubular extension above a base, the tubular extension forming the recess and comprising a snap ring groove, the snap ring partially seated in the snap ring groove and partially extending above the lock ring.

26. The electric submersible motor thrust bearing system of claim 25, wherein the lock ring surrounds the split ring, and the tubular extension surrounds the lock ring.

* * * * *